(12) United States Patent
Delva et al.

(10) Patent No.: US 8,724,298 B2
(45) Date of Patent: May 13, 2014

(54) PANEL DISPLAY SUSPENSION SYSTEM AND A PANEL DISPLAY PROVIDED WITH A PANEL DISPLAY SUSPENSION SYSTEM

(75) Inventors: Pieter Jan Delva, Bruges (BE); Maxime Leon Marie Joseph Verdin, Bruges (BE)

(73) Assignee: TP Vision Holding B.V., Eindhoven (NL)

( * ) Notice: Subject to any disclaimer, the term of this patent is extended or adjusted under 35 U.S.C. 154(b) by 321 days.

(21) Appl. No.: 13/055,516

(22) PCT Filed: Jul. 23, 2009

(86) PCT No.: PCT/IB2009/053197
§ 371 (c)(1),
(2), (4) Date: Jan. 24, 2011

(87) PCT Pub. No.: WO2010/013176
PCT Pub. Date: Feb. 4, 2010

(65) Prior Publication Data
US 2011/0116219 A1    May 19, 2011

(30) Foreign Application Priority Data

Jul. 28, 2008  (EP) .................................... 08161245

(51) Int. Cl.
*H05K 5/00*         (2006.01)
(52) U.S. Cl.
USPC ............ 361/679.01; 248/65; 248/70; 248/73; 248/146; 248/274.1

(58) Field of Classification Search
USPC ............... 361/679.01; 248/274.1, 176.1, 371, 248/231.71, 176.3, 284.1, 291.1, 476, 248/289.1, 179.1, 214, 65, 70, 73, 98, 129, 248/146, 155.3, 181.1, 181.2
See application file for complete search history.

(56) References Cited

U.S. PATENT DOCUMENTS

| 3,155,358 | A   |   | 11/1964 | Carlson |
|-----------|-----|---|---------|---------|
| 5,791,621 | A   |   | 8/1998  | Yashima |
| 6,685,033 | B1  | * | 2/2004  | Baddour et al. ................. 211/26 |
| 7,448,580 | B2  | * | 11/2008 | Shimizu et al. ............ 248/176.3 |
| 2005/0127253 | A1 |   | 6/2005  | Kim |
| 2006/0261226 | A1 |   | 11/2006 | Petrick et al. |

FOREIGN PATENT DOCUMENTS

| AT | 296525 B | 2/1972 |
|----|----------|--------|
| DE | 3019057 A1 | 11/1981 |
| KR | 20040021741 A | 3/2004 |

* cited by examiner

Primary Examiner — Robert J Hoffberg
Assistant Examiner — Hung Dang
(74) Attorney, Agent, or Firm — Shimokaji & Assoc., P.C.

(57) ABSTRACT

A panel display suspension system comprising a first mounting part and a second mounting part. In order to be able to easily adjust the horizontal position of a suspended panel display (7) the first mounting part is provided with a supporting rail-shaped body (1) and the second mounting part is provided with supporting movers (3) for cooperation with the rail-shaped body. One of the mounting parts is configured for securing to the panel display and the other mounting part is configured for securing to a wall.

9 Claims, 2 Drawing Sheets

PANEL DISPLAY SUSPENSION SYSTEM AND A PANEL DISPLAY PROVIDED WITH A PANEL DISPLAY SUSPENSION SYSTEM

FIELD OF THE INVENTION

The invention relates to a panel display suspension system comprising a first mounting part and a second mounting part, wherein one of said parts is configured for securing to a panel display and the other part is configured for securing to an upright structure.

The invention also relates to a panel display provided with such a panel display suspension system.

BACKGROUND OF THE INVENTION

The patent application US 2006/0261226 A1 discloses a flat panel display wall mounting system that includes a plate assembly connected to a flat panel display mounting rack assembly. The wall plate assembly, which is separated from the rack assembly during mounting on a wall, is provided with a bar and two angled slots. The wall plate assembly is attached to the wall by anchoring elements disposed through these angled slots. The angled slots serve to level the wall plate assembly on the wall. Once the wall plate assembly is leveled, the wall plate assembly is further secured to the wall. The rack assembly, which is provided with a U-shaped channel, is mounted to the flat panel display. Once the rack assembly is connected to the flat panel display and the wall plate assembly is attached to the wall, the flat panel is lifted to a position in which the U-shaped channel of the rack assembly engages the bar of the wall plate assembly, whereafter the flat panel display hangs on the wall plate assembly and thus on the wall.

Although the wall plate assembly is provided with angled slots for leveling purposes, the known system has the disadvantage that a horizontal adjustment of the mounted flat panel display is not possible. It has proved that already a small deviation of the exact horizontal orientation of the mounted wall plate assembly or a small tolerance difference in a component of the mounting system often results in an unacceptable deviation of the horizontal orientation of the mounted flat panel display. Generally, it is very difficult for customers to horizontally mount a flat panel display on a wall. Even with the use of an appropriate tool, such as a level, tolerances in the applied mounting mechanism implicate that the mounted flat panel display is rarely completely horizontally aligned.

SUMMARY OF THE INVENTION

It is an object of the invention to provide a panel display suspension system, by means of which it is easy to adjust the horizontal position of a suspended panel display.

This object is achieved by the panel display suspension system according to the invention as defined in claim 1. More particularly, the panel display suspension system according to the invention comprises a first mounting part provided with a supporting bent guiding track and a second mounting part provided with a supporting mover device for cooperation with said track, wherein one of said parts is configured for securing to a panel display and the other part is configured for securing to an upright structure. It is noted that the term panel display corresponds to the usually used term flat panel display and thus involves panel-like televisions and monitors. Flat panel displays may be formed using many technologies, such as liquid crystal displays (LCD) and plasma displays (PDP). The term panel display also involves panel screens, such as e.g. used for projection television. It is further noted that the term upright structure involves an at least substantially vertical wall or a wall portion, e.g. of a room, but it may also be a pillar, a stand and the like. Moreover it is noted that the first and second mounting parts have the mechanical properties, e.g. as to strengths, stiffness and the like, usually required for mounting parts and elements. The material of the mounting parts may be metal, such an aluminum or steel. Preferably, anodized clear aluminum is used. In principle each material, including plastics, having the right properties is suitable. To secure a mounting part to the upright structure, appropriate anchoring means, such as screw bolts and plugs or nuts and bolts, can be used. Similar means can be used for securing a mounting part the panel display. In both cases it is even possible to make use of an adhesive for performing a secure fastening. Because of the specific measure applied into the system according to the invention it is not critical for the mounting parts to be secured to the upright structure and the panel device in directions exactly corresponding to prescribed direction. For example, the mounting part secured to the upright structure does not need to be perfectly horizontally aligned. After securing the first mounting part and the second mounting part to the upright structure and the panel display, both mounting parts are united, whereby the mover device and the guiding track come into contact with each other for cooperation. After uniting the first and second mounting part the mover device and the guiding track perform their supporting function and are able to move with regard to each other in a direction corresponding to a longitudinal direction of the track. By performing such a movement a mechanic or a user of the panel display is able to perfectly adjust a desired orientation, usually the horizontal direction, of the display device. The mover device is preferably configured for making sliding movements with regard to the guiding track, but may be configured for making running movements.

In a practical embodiment of the panel display suspension system according to the invention the bent guiding track has a profile substantially being in a vertical plane, after securing the first mounting part.

A preferred embodiment of the panel display suspension system according to the invention is characterized in that the bent guiding track is constituted by a curved guiding surface. Such a guiding surface is easy to follow by the mover device and provides good adjusting possibilities. For among others manufacturing reasons the curve of the guiding surface is preferably an arc of a circle. The optimal radius, i.e. the radius with which the adjustment of the horizontal direction is best obtainable, is largely dependent from the size and the weight of the panel display.

In a practical embodiment of the panel display suspension system according to the invention the curved guiding surface has a sag, which is downwardly oriented after securing the first mounting part. An advantage of mounting the guiding surface into a downwardly oriented sag position is that the system tends to move towards a center region of the track with limited friction at its bottom side. In a construction wherein the sag is upwardly oriented the system tends to move towards the left or right ends of the track which implicates the need of blocking features to prevent dropping out of the track.

A preferred embodiment of the panel display suspension system according to the invention is characterized in that the first mounting part includes a bent rail-shaped body providing the guiding track. The first mounting part may substantially be the rail-shaped body, resulting into a simple mounting bracket. For manufacture and costs reasons the rail-shaped body is preferably a one-piece body.

A preferred embodiment of the panel display suspension system according to the invention is characterized in that the supporting mover device includes two separated movers, each arranged for cooperation with the guiding track. The movers can be secured independently from each other and can be designed as sliders, runners and the like. In a specific embodiment, especially meant for a light set, only one mover is provided, wherein the mover is provided with positioning features to prevent wobbling of the display.

A preferred embodiment of the panel display suspension system according to the invention is characterized in that the rail-shaped body is provided with two substantially parallelly arranged inwardly bent flanges, wherein the movers have substantially the form of drawing-pins, whose heads are arranged for cooperation with said inwardly bent flanges of the rail-shaped body. In this way a simple but reliable suspension system is obtained. In the assembled state of the system the drawing-pin-like movers, which can also be called mushroom-like movers, extend into the space between the flanges of the rail-shaped body, wherein their heads are supported by the flanges of the rail-like body.

A preferred embodiment of the panel display suspension system according to the invention is characterized in that at least one of inwardly bent flanges of the rail-shaped body is provided with one or more insert apertures for inserting the movers. Such apertures simplify the insertion of the movers into the rail-shaped body. In practical embodiments the insert apertures are provided in those flanges which are after mounting of the system the upper flanges. In very basic embodiments no insert apertures are provided.

In a practical embodiment of the panel display suspension system according to the invention the second mounting part is equipped for securing to the panel display.

A preferred embodiment of the panel display suspension system according to the invention is characterized in that the movers fit into upper mounting holes of the panel display, particularly arranged according to the Mounting Interface Standard of the Video Electronics Standards Association (VESA). The Mounting Interface Standard (MIS) is a family of standards defined by the Video Electronics Standards Association (VESA) for mounting flat panel monitors, TVs, and other displays to stands and wall mounts. The standard is implemented in most modern flat panel TVs and monitors. The movers applied in the suspension system according to the invention are preferably provided with screw thread for screwing them into holes determined by the VESA standard.

A preferred embodiment of the panel display suspension system according to the invention is characterized by the presence of at least one distance holder. In the suspended situation of the panel display device such a holder is located, somewhat below the mounting parts, between the rear side of the display device and the upright structure and can be used for adjusting a view angle. Moreover or alternatively such a holder provides a certain friction with the panel display and/or the upright structure and thereby provides a lock against an unwanted sideways movement of the suspended display with regard to the upright structure.

A preferred embodiment of the panel display suspension system according to the invention is characterized in that the distance holder fits into a lower mounting hole of the panel display, particularly arranged according to the Mounting Interface Standard of the Video Electronics Standards Association (VESA). For reasons of symmetry preferably two distance holders are used. The distance holders applied in the suspension system according to the invention are preferably provided with screw thread for screwing them into holes determined by the VESA standard. In a practical embodiment the distance holder is constituted by a mushroom-like part of which the stem is provided with screw thread and the head is provided with a spacer.

The panel display according to the invention is provided with the panel display suspension system according to the invention.

The invention also relates to a bent rail-shaped body for use in the panel display suspension according to the invention. the rail-shaped body according to the invention is provided with two substantially parallelly arranged inwardly bent flanges, wherein at least one of the flanges is provided with an insert aperture for inserting a mover.

With reference to the Claims it is noted that all possible combinations of features mentioned in the Claims are part of the invention.

These and other aspects of the invention are apparent from and will be elucidated with reference to the examples described hereinafter.

DETAILED DESCRIPTION

It is noted that the disclosed embodiment is schematically depicted.

Figure 1:
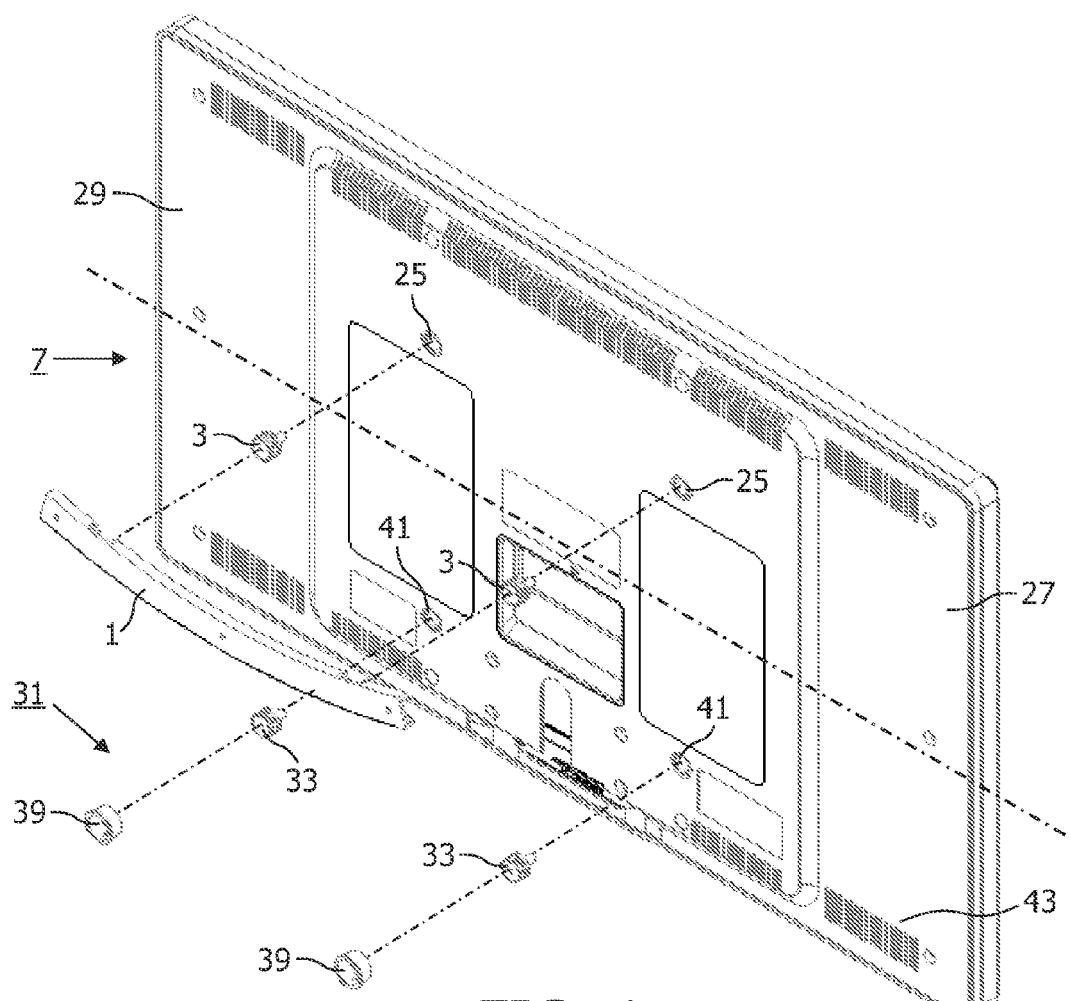
FIG. 1 is an exploded view, in a rear view, of an embodiment of the display suspension system according to the invention.
Figure 2:
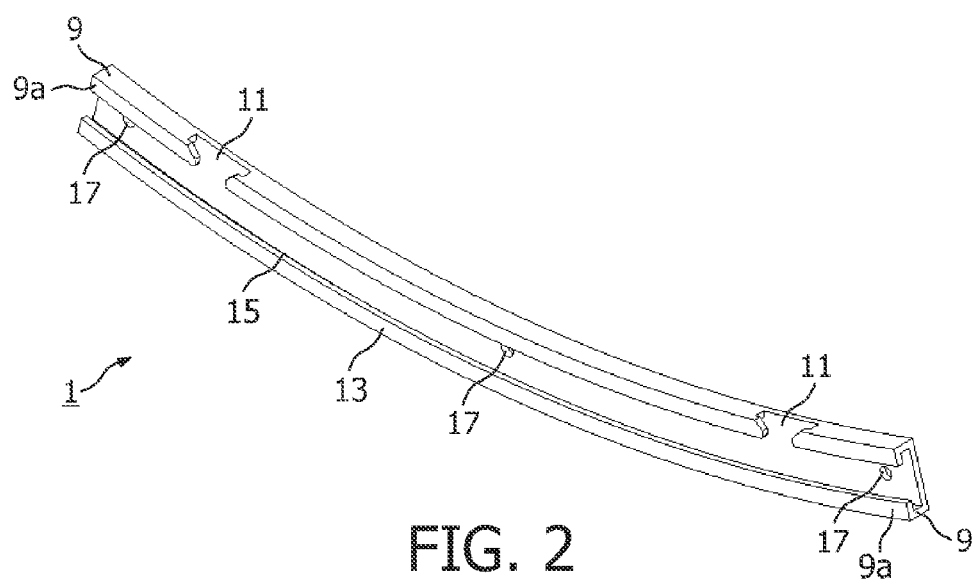
FIG. 2 is a perspective view of a mounting part of the embodiment of FIG. 1.
Figure 3:
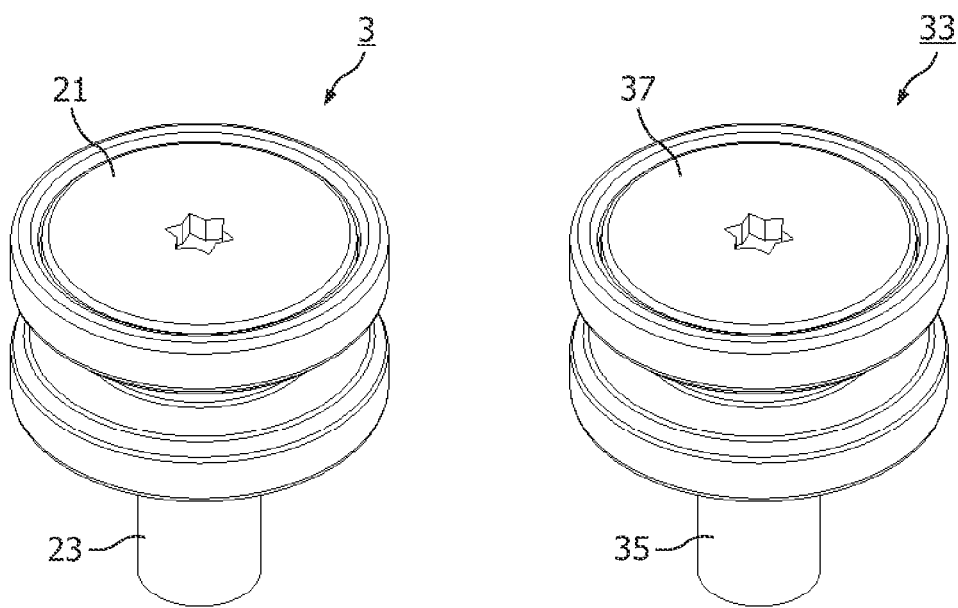
FIG. 3 is a perspective view of another mounting part of the embodiment of FIG. 1.
Figure 4:
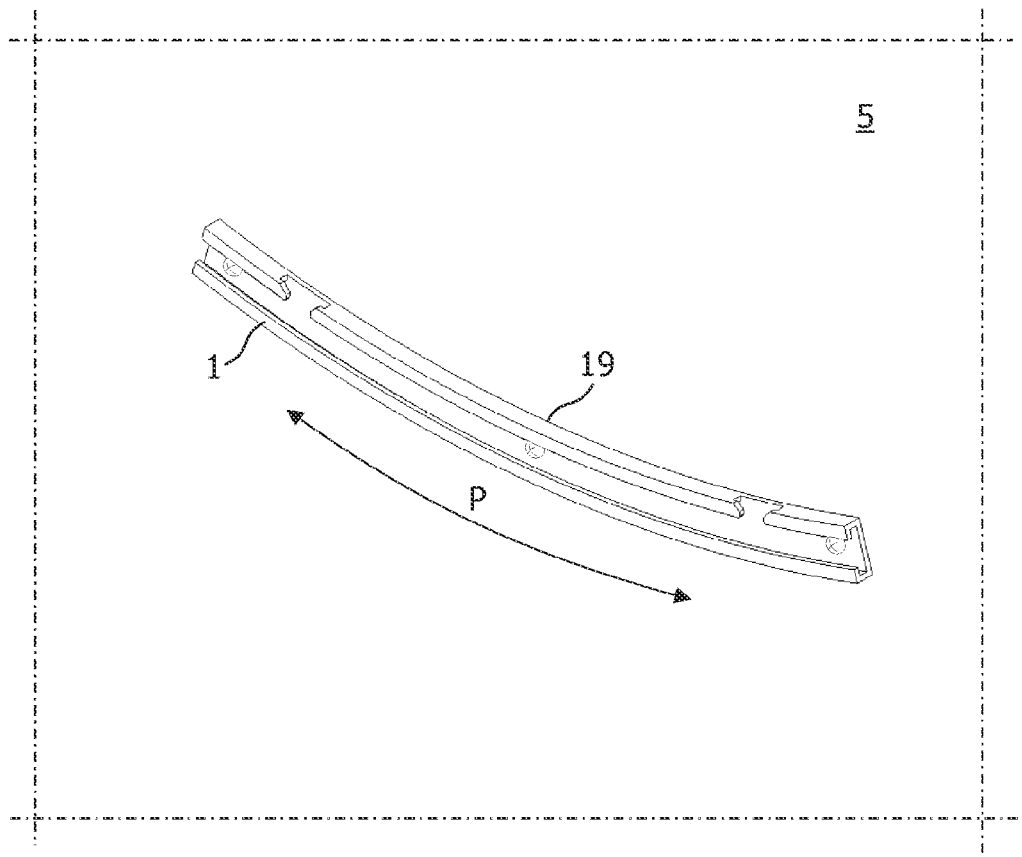
FIG. 4 is a perspective view of the mounting part shown in FIG. 2, mounted on a wall.

The panel display suspension system depicted in FIGS. 1 to 4 comprises a bent, more particularly a curved, supporting rail-shaped body 1 and a two supporting drawing-pin-shaped movers 3. The rail-shaped body 1 is meant for mounting on a wall 5, while the movers 3 are meant for mounting to a flat panel display 7. The rail-shaped body 1 is made of aluminum and the movers 3 are made of a polycarbonate with a filler (PC 10 GF), with metal screws embedded or inserted. The rail-shaped body 1 has two parallel flanges 9 each provided with an inwardly bent edge 9a. One of these flanges is provided with insert apertures 11. The flanges 9, more specifically their edges 9a, constitute a curved guiding surface 13 defining a curved guiding track 15. The rail-shaped body 1 is further provided with mounting holes 17 through which usual mounting elements, such as screw bolts, can be inserted. Mounting of the rail-shaped body 1 on the wall 5 can take place without punctual attention for obtaining a horizontal arrangement. After mounting, the rail-shaped body 1 has a downwardly oriented sag 19. The orientation of the mounted rail-shaped body 1 is such that the flanges 9 are positioned one above the other.

Each of the movers 3 has a head 21 and a stem 23 provided with a screw thread. The stems 23 are adapted to holes 25 provided in an upper part 27 of the rear side 29 of the flat panel display 7 and can be screwed in these holes. The holes 25 usually meet the requirements of the Mounting Interface Standard of the Video Electronics Standards Association (VESA). After finishing the connection of the rail-shaped body 1 to the wall 5 and the connection of the movers 3 to the panel display 7, the rail-shaped body 1 and the movers 3 are assembled by lifting the panel display 7 into position, whereafter the movers 3 are inserted into the insert apertures 11 for bringing them into the rail, followed by a small sideward movement of the display 7 for bringing the movers 3 into contact with the flange edges 9a. At this stage a horizontal adjustment of the panel display 7 can take place by simply performing a sideward movement of the display 7, whereby the movers 3 slide along the curved guiding surface 13. Once the horizontal orientation of the panel display 7 has been reached, after one or some sideward movements, indicated by arrow P, of the display 7, the adjustment can be stopped. Obviously, the bent rail-shaped body has a length with is sufficient large to be able to make the required sidewards movements of the suspended display. However, the length of the rail-shaped body is preferably short enough to be covered by the adjusted display.

The panel display suspension system depicted in FIGS. 1 to 4 further comprises two distance holders 31. The distance holders 31 are made of a polyurethane. Each holder 31 is formed by a drawing-pin-shaped part 33 having a stem 35 provided with a screw thread and having a head 37 carrying a spacer 39. The stems 35 are adapted to holes 41 provided in an lower part 43 of the rear side 29 of the flat panel display 7 and can be screwed in these holes. The holes 41 usually meet the requirements of the Mounting Interface Standard of the Video Electronics Standards Association (VESA). After suspending and horizontally adjusting the panel display 7 the distance holders 31 extend from the display 7 to the wall 5. The holders 31 serve as a lock for preventing unwanted movements of the adjusted display 7. Moreover, the angle of inclination of the display 7 can be adjusted by the distance holders 31, which may be adjustable holders.

Summarizing, the depicted panel display suspension system according to the invention comprises a first mounting part and a second mounting part. In order to be able to easily adjust the horizontal position of the suspended panel display (7) the first mounting part is provided with the supporting rail-shaped body (1) and the second mounting part is provided with supporting movers (3) for cooperation with the rail-shaped body. One of the mounting parts is configured for securing to the panel display and the other mounting part is configured for securing to a wall or other upright structure.

While the invention has been illustrated and described in detail in the drawings and foregoing description, illustration and description are to be considered illustrative or exemplary and not restrictive. The invention is not limited to the disclosed embodiment, for example, it is possible to apply a bent or curved rail-shaped body provided with an upwardly oriented sag. It is also possible to make use of movers of a shape different from the depicted shape. It is further possible to abandon the distance holders. Moreover it is possible to mount the rail-shaped body to the panel display and to mount the mover device to the wall or other upright structures. It is even possible to make use of additional mounting plates for fastening the mounting parts to displays and/or upright structures. All components of the suspension system according to the invention can be made from materials known per se. Other variations to the disclosed embodiment can be understood and effected by the skilled person in practicing the claimed invention, from a study of the drawings, the description and the claims. It is further noted that the system according to the invention and all its components can be made by applying processes and materials known per se. In the Claims and the description the word "comprising" does not exclude other elements, and the indefinite article "a" or "an" does not exclude a plurality. Any reference sign in the Claims should not be construed as limiting the scope.

The invention claimed is:

1. A panel display suspension system comprising:
   a first mounting part provided with a supporting bent guiding track;
   a second mounting part coupled to said bent guiding track, wherein the second mounting part is provided with two separated movers,
   wherein one of said mounting parts is configured to be secured to a panel display and another of said mounting parts is configured to be secured to an upright structure,
   wherein the two separated movers are disposed to move within the bent guiding track,
   wherein the guiding track has a bent rail-shaped body provided with two substantially parallel flanges, each of the flanges provided with an inwardly bent edge that extends toward each other, and
   wherein at least one of the flanges is provided with an insert aperture for inserting each mover of the two separated movers.

2. The panel display suspension system as claimed in claim 1, wherein the bent guiding track is constituted by a curved guiding surface.

3. The panel display suspension system as claimed in claim 2, wherein the curved guiding surface has a sag, which is downwardly oriented after securing the first mounting part to either the panel display or the upright structure.

4. The panel display suspension system of claim 1, wherein the movers have substantially a form of drawing-pins, whose heads are arranged for cooperation with said flanges of the rail-shaped body.

5. The panel display suspension system as claimed in claim 1, wherein the one of said mounting parts is the second mounting part.

6. The panel display suspension system as claimed in claim 5, wherein the movers fit into upper mounting holes of the panel display, particularly arranged as an array of holes.

7. The panel display suspension system as claimed in claim 1, comprising a pair of distance holders configured to act as spacers between the display panel and the upright structure.

8. The panel display suspension system as claimed in claim 7, wherein one of the distance holders fits into a lower one of a plurality of mounting holes of the panel display, the plurality of mounting holes arranged as an array.

9. A suspension system comprising:
   a panel display;
   a panel display suspension system attached to a rear portion of the panel display, including:
      a first mounting part provided with a supporting bent guiding track;
      a second mounting part coupled to said bent guiding track, wherein the second mounting part is provided with two separated movers,
      wherein one of said mounting parts is configured to be secured to the rear portion of the panel display and another of said mounting parts is configured to be secured to an upright structure,
      wherein the two separated movers are disposed to move within the bent guiding track,
      wherein the guiding track has a bent rail-shaped body provided with two flanges, each of the flanges being provided with an inwardly bent edge that extends toward each other, and
      wherein at least one of the flanges is provided with an insert aperture for inserting each mover of the two separated movers.

* * * * *